United States Patent
Burmeister et al.

(10) Patent No.: US 7,544,421 B2
(45) Date of Patent: *Jun. 9, 2009

(54) FIRE BEHAVIOR OF A FLOOR COVERING BASED ON LINOLEUM AND CORK

(75) Inventors: Guido Burmeister, Lauffen am Neckar (DE); Hanns-Jörg Mauk, Mundelsheim (DE); Milko Ess, Freiberg am Neckar (DE)

(73) Assignee: Armstrong DLW AG, Bietigheim-Gissingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/499,350

(22) PCT Filed: Nov. 29, 2002

(86) PCT No.: PCT/EP02/13521

§ 371 (c)(1),
(2), (4) Date: Feb. 1, 2005

(87) PCT Pub. No.: WO03/052196

PCT Pub. Date: Jun. 26, 2003

(65) Prior Publication Data

US 2005/0115180 A1    Jun. 2, 2005

(30) Foreign Application Priority Data

Dec. 19, 2001   (DE) ................. 101 62 528

(51) Int. Cl.
- *D06N 1/00* (2006.01)
- *B29C 67/00* (2006.01)
- *B05D 5/00* (2006.01)
- *B05D 7/06* (2006.01)
- *B32B 7/12* (2006.01)

(52) U.S. Cl. ............ 428/456; 106/18.14; 264/175; 427/428.01; 428/317.1; 428/448; 428/537.1; 428/908.8; 428/920; 428/921

(58) Field of Classification Search .......... 106/18.14; 428/908.8, 921, 331, 920, 317.1, 317.3, 317.7, 428/317.9, 323, 343; 427/207.1, 243, 244, 427/428.01, 448, 456, 537.1; 264/175
See application file for complete search history.

(56) References Cited

U.S. PATENT DOCUMENTS

| | | | | |
|---|---|---|---|---|
| 2,412,303 A | | 12/1946 | Spitzli et al. | |
| 2,428,282 A | * | 9/1947 | Kemmler | 524/143 |
| 2,552,600 A | * | 5/1951 | Stubblebine | 524/143 |
| 2,611,715 A | * | 9/1952 | Palmer et al. | 106/252 |
| 2,617,750 A | * | 11/1952 | Le Clair et al. | 428/528 |
| 2,775,994 A | * | 1/1957 | Rowe | 264/74 |
| 3,150,031 A | * | 9/1964 | Powell | 428/142 |
| 4,018,616 A | * | 4/1977 | Sugahara et al. | 106/629 |
| 4,107,376 A | * | 8/1978 | Ishikawa | 428/305.5 |
| 4,256,798 A | * | 3/1981 | Witt et al. | 428/215 |
| 4,574,074 A | * | 3/1986 | Cristol et al. | 423/124 |
| 5,910,358 A | * | 6/1999 | Thoen et al. | 428/316.6 |
| 6,462,123 B1 | * | 10/2002 | Burmeister et al. | 524/448 |
| 6,831,023 B1 | * | 12/2004 | Szerreiks et al. | 442/110 |
| 7,238,416 B2 | * | 7/2007 | Mauk et al. | 428/317.1 |
| 2005/0011401 A1 | * | 1/2005 | Bauer et al. | 106/18.11 |
| 2005/0048278 A1 | * | 3/2005 | Reichwein et al. | 428/331 |

FOREIGN PATENT DOCUMENTS

| | | |
|---|---|---|
| DE | 101 30 217 A1 | 1/2003 |
| GB | 761672 | 11/1956 |
| WO | WO 02/081812 A2 | 10/2002 |

OTHER PUBLICATIONS

Derwent Abstract No. 1973-73470U, abstract of Soviet Union Patent Specification No. 376504A (Apr. 5, 1973).*
Derwent Abstract No. 1979-82128B, abstract of Soviet Union Patent Specification No. 648577A (Feb. 25, 1979).*
Derwent Abstract No. 1982-25751E, abstract of Soviet Union Patent Specification No. 833914B (May 30, 1981).*
Derwent Abstract No. 1990-082264, abstract of Soviet Union Patent Specification No. 1484812 (Jun. 7, 1989).*
Database WPI, Section Ch, Week 197726, Derwent Publications Ltd., London, GB XP-002236566.

* cited by examiner

*Primary Examiner*—Anthony J Green
(74) *Attorney, Agent, or Firm*—Sughrue Mion, PLLC

(57) ABSTRACT

The present invention relates to a floor covering based on linoleum having improved fire-protection properties, comprising at least one wear layer made of linoleum, which contains at least one phosphorus-containing compound, solution, suspension, or dispersion as a liquid/viscous flame retardant in a quantity of up to 20 weight-percent, in relation to the quantity of the wear layer, as well as a method for the manufacture thereof. Furthermore, the present invention relates to a floor covering based on cork having improved flame protection properties, comprising at least one phosphorus-containing compound, solution, suspension, or dispersion as a liquid/viscous flame retardant in a quantity of up to 20 weight-percent, in relation to the quantity of the wear layer.

6 Claims, No Drawings

FIRE BEHAVIOR OF A FLOOR COVERING BASED ON LINOLEUM AND CORK

The present invention relates to a floor covering based on linoleum having improved flame-protection properties, including at least one wear layer made of linoleum, which contains at least one phosphorus-containing compound, solution, suspension, or dispersion as a liquid/viscous flame retardant in a quantity of up to 20 weight-percent, in relation to the quantity of the wear layer, as well as a method for the manufacture thereof. Furthermore, the present invention relates to a floor covering based on cork having improved flame protection properties, including at least one phosphorus-containing compound, solution, suspension, or dispersion as a liquid/viscous flame retardant in a quantity of up to 20 weight-percent, in relation to the quantity of the wear layer.

Floor coverings based on linoleum and methods for their manufacture have been known for some time. However, a disadvantage of the linoleum-based floor coverings known in the related art is the critical behavior in fire. Linoleum only reaches building material class B1 with difficulties (fire testing according to DIN 4102 T14, "Radiant Foreign Panel Test"). In the future, the requirements for floor coverings are to be sharpened by a new EN norm. For example, currently a linoleum floor covering must reach a critical radiation intensity of $\geq 4.5$ kW/m$^2$ in accordance with DIN 4102 T14 in order to be classified in the economically important building material class B1. Upon a future introduction of the novel test methods according to EN ISO 9239-1 and EN ISO 11925-2, which is similar to the old test DIN 4102 T14, but whose classification is performed according to prEN 13501-1, floor coverings, particularly linoleum, having a test result of $\geq 4.5$ kW/m$^2$ are no longer classified in B1, but rather in $C_{FL}$. Significant competitive disadvantages in relation to other plastic floor coverings, such as PVC, may arise from this. Only at a critical radiation intensity of $\geq 8$ kW/m$^2$ would the classification in the economically important material class $B_{FL}$ be possible. The critical fire behavior is also a disadvantage of the cork-based floor coverings known in the related art.

Therefore, the present invention is based on the object of providing a floor covering based on linoleum or cork which is to have significantly improved fire behavior in comparison to the linoleum or cork floor coverings known in the related art.

This object is achieved by the features characterized in the claims.

In particular, a floor covering based on linoleum is provided, comprising at least one wear layer made of linoleum which contains at least one phosphorus-containing compound, solution, suspension, or dispersion as a liquid/viscous flame retardant in a quantity of up to approximately 20 weight-percent, preferably up to approximately 10 weight-percent, in relation to the quantity of the wear layer.

The liquid/viscous flame retardant is preferably selected from the group of phosphates, phosphites, phosphonates, organically substituted phosphonates, and mixtures thereof. Examples of organically substituted phosphonates are cyclic or acyclic esters of organic phosphonic acids, such as diesters, e.g., dimethyl propane phosphonate. According to a further preferred embodiment of the present invention, an aqueous/oleaginous dispersion containing red phosphorus may be used as the liquid/viscous flame retardant. This may be stabilized and microencapsulated red phosphorus, wherein water or castor oil may be used as the carrier. The phosphorus content is preferably between 40 and 60 weight-percent, in relation to the total dispersion. Of course, a mixture made of red phosphorus and at least one of the above-mentioned liquid/viscous flame retardants may also be used.

According to the present invention, a liquid/viscous flame retardant is understood as a flame retardant having a dynamic viscosity of up to approximately 40,000 Pa·s (100° C.), preferably up to 5000 Pa·s (100° C.), especially preferably up to 200 Pa·s (100° C.).

The additional flame retardants usable in the wear layer made of linoleum are not subject to any special restriction and, for example, the flame retardants known in the related art from the group of carbonization-promoting and fire-smothering flame retardants, such as ammonium phosphate or dipentaerythritol, the flame retardants which form a barrier layer, such as borates and aluminum polyphosphates, the solid inorganic flame retardants, and the flame retardants which form an insulating layer and/or intumescence agents may be used. Furthermore, halogenated organic compounds, such as chlorinated paraffins, or halogenated organic phosphorus compounds may be used as an additional flame retardant. Solid inorganic flame retardants are understood to include, for example, inorganic compounds, such as aluminum oxide hydrates, borates, e.g., zinc borates, ammonium phosphate, antimony oxides, aluminum hydroxides, preferably aluminum trihydroxide, and magnesium hydroxide, aluminum hydroxide and magnesium hydroxide also being referred to as water-releasing flame retardants. The proportion of the solid inorganic flame retardant is preferably up to approximately 60 weight-percent, especially preferably up to approximately 30 weight-percent, in relation to the quantity of the wear layer. The solid inorganic flame retardant aluminum trihydroxide is especially preferred. These flame retardants may be provided in the linoleum wear layer singly or as a mixture containing at least two of these flame retardants (from the same or different of the above-mentioned groups).

Furthermore, the processing properties may be significantly improved by additionally incorporating water glass (i.e., an "internal frame" forms in the mixed compound and thus stiffens the mixed compound) and the maturing time may be significantly shortened. The usable water glass, which is a flame retardant forming a barrier layer, is sodium silicate, for example. A mixture of at least two different flame retardants which form a barrier layer, i.e., water glass in combination with one or more of the above-mentioned flame retardants which form a barrier layer, for example, may also be used in the linoleum wear layer. Water glass may be provided in the wear layer made of linoleum in a quantity of up to approximately 15 weight-percent, in relation to the quantity of the wear layer.

In contrast to the typical understanding that highly alkaline substances have a destructive effect on the structure of the linoleum, if additional water glass is used in proportions up to 15%, it may be determined, surprisingly, that the pH value is regulated via the acids naturally contained in the linoleum cement and the acids arising during the cement cooking and the maturing.

Furthermore, if sodium silicate is used, for example, it may be determined that this water glass may be polycondensed in a long chain in principle and an "internal frame" is thus formed in the linoleum compound, which, in connection with the oxidative maturing of the linoleum, leads to a more rapidly hardening material having improved properties with regard to fire behavior, degree of hardness, flexibility, abrasion, etc., for example. In addition, if water glass is used in connection with the liquid/viscous flame retardants according to the present invention, the stiffening properties of water glass may be approximately canceled out by a saponification process of the liquid/viscous flame retardant, the salts which are released acting as a pH buffer and the linoleum compound able to be kept essentially pH neutral.

Furthermore, the wear layer made of linoleum comprises typical components, such as binders (Bedford cement or B cement made of partially-oxidized linseed oil and at least one resin as a tackifier), at least one filler, and if necessary at least one coloring agent. Typically, softwood flour and/or cork flour (if wood flour and cork flour are present simultaneously, typically in the weight ratio 90:10) and/or chalk, kaolin (China clay), diatomaceous earth, and heavy spar are used as fillers. In addition, precipitated silicic acid and small quantities of water glass, for example, water glass in a quantity of up to 15 weight-percent in relation to the quantity of the wear layer, may be added to stiffen the mass.

The linoleum mixed mass typically contains at least one coloring agent, such as a pigment (e.g., titanium dioxide), and/or other typical coloring agents based on inorganic and organic dyes. Any natural or synthetic dyes as well as inorganic or organic pigments, alone or in any arbitrary combination, may be used as coloring agents.

A typical linoleum composition contains, in relation to the weight of the wear layer, approximately 40 weight-percent binder, approximately 30 weight-percent organic materials, approximately 20 weight-percent inorganic (mineral) fillers, and approximately 10 weight-percent coloring agents. Furthermore, typical additives, such as processing aids, antioxidants, UV stabilizers, lubricants, and the like, which are selected as a function of the binder, may be contained in the linoleum mixed mass.

In addition, the floor covering based on linoleum according to the present invention may be implemented as electrically conductive by adding at least one derivative of imidazole, imidazoline, benzimidazole, or morpholine, or a cationically-active compound (cf. DE 34 16 573 and WO 99/10592) and/or by positioning a layer based on linoleum, which contains at least one electrically conductive filler, such as carbon black or metal powder, under the linoleum wear layer. Of course, an electrically conductive layer of this type may also contain one or more of the above-mentioned flame retardants.

The linoleum wear and/or top layer preferably has a thickness of 0.9 to 6.0 mm, especially preferably 1.4 to 4 mm. In the scope of the present invention, the wear layer is understood as the uppermost layer of the floor covering, made of a homogeneous material.

The floor covering based on linoleum according to the present invention may be carrierless (cf. DE 199 10 389 A1) or include a carrier. A material based on natural or synthetic woven or knitted fabrics or textile materials may be used as the carrier material. Examples are jute fabrics, mixed fabrics made of natural fibers, such as cotton and rayon fiber, glass cloth, glass cloth coated with adhesive-promoting agent, mixed fabrics made as synthetic fibers, fabrics made of core/mantel fibers having a core made of polyester and a mantel made of polyamide, for example. For example, a coating of the glass fibers made of a styrene-butadiene latex may be used as the adhesive-promoting agent for glass cloth.

The floor covering according to the present invention may be implemented with or without a carrier, the linoleum wear layer able to be designed as both single-layer and multilayered. In this case, depending on the layer sequence, both symmetrical and asymmetrical sheet materials result, symmetrical constructions being preferred for carrierless linoleum sheet materials. For example, the floor covering according to the present invention may include two layers made of linoleum (materially homogeneous), which may be identical or different.

Furthermore, a corkment layer with or without a carrier may be positioned under the linoleum wear layer. Corkment is a mixture which contains B cement and milled cork as a filler and ensures better thermal insulation, impact elasticity, and walking comfort and damps the impact and airborne noise as an insulating underlayer in floor coverings. A corkment layer of this type may also include one or more of the above-mentioned flame retardants.

In addition, functional layers may also be positioned under or between two linoleum layers, so that three-layered or multilayered sheet materials result. For example, at least one further layer, preferably a foam layer, a layer for impact noise damping, and/or an insulation layer may be positioned under the wear layer of the floor covering according to the present invention. The layer thicknesses of the applied layers may be identical or different. All of these functional layers positioned under or between two linoleum layers may also each contain one or more of the above-mentioned flame retardants.

Furthermore, at least one adhesive layer may be positioned on the back of the floor covering according to the present invention without a carrier.

The floor covering based on linoleum according to the present invention may be provided in the form of webs or tiles.

For example, the floor covering based on linoleum according to the present invention may be manufactured through typical methods for manufacturing single-layer or multilayered linoleum floor coverings with or without a carrier. Preferably, during the processing of linoleum cements, which are manufactured from drying vegetable oils and/or fats and tree resins in accordance with the requirements of DIN EN 548, phosphates, phosphites, phosphonates, organically substituted phosphonates or mixtures thereof are already added at the step of the oil oxidation process in order to cause a reaction of the above-mentioned phosphor compounds with free double bonds, for example, or esterification with existing OH groups or at least achieve intimate binding (mixing) with the linoleum cement.

Furthermore, the present invention provides a typical method for manufacturing a floor covering based on linoleum, comprising at least one wear layer made of linoleum, which contains at least one phosphorus-containing compound, solution, suspension, or dispersion as a liquid/viscous flame retardant in a quantity of up to 20 weight-percent, in relation to the quantity of the wear layer, in which the linoleum mixed mass containing at least one liquid/viscous flame retardant is processed, using calenders or rolling mills, into a floor covering with or without a jute carrier. According to a preferred embodiment of the manufacturing method according to the present invention, as defined above, at least one material from the group of phosphates, phosphites, phosphonates, organically substituted phosphonates, and mixtures thereof may be selected as the liquid/viscous flame retardant. According to a further preferred embodiment, as defined above, an aqueous/oleaginous dispersion containing red phosphorus or a mixture made of red phosphorus and at least one of the above-mentioned liquid/viscous flame retardants may also be used.

Furthermore, the present invention provides a floor covering based on cork, comprising at least one phosphorus-containing compound, solution, suspension, or dispersion as a liquid/viscous flame retardant in a quantity of up to approximately 20 weight-percent, preferably up to approximately 10 weight-percent, in relation to the quantity of the wear layer.

The liquid/viscous flame retardant is preferably selected from the group of phosphates, phosphites, phosphonates, organically substituted phosphonates, and mixtures thereof.

Examples of organically substituted phosphonates are cyclic or acyclic esters of organic phosphonic acids, such as diesters, e.g., dimethyl propane phosphonate. According to a further preferred embodiment of the present invention, an aqueous/oleaginous dispersion containing red phosphorus may be used as the liquid/viscous flame retardant. This may be stabilized and microencapsulated red phosphorus, wherein water or castor oil may be used as the carrier. The phosphorus content is preferably between 40 and 60 weight-percent, in relation to the total dispersion. Of course, a mixture made of red phosphorus and at least one of the above-mentioned liquid/viscous flame retardants may also be used.

The liquid/viscous flame retardant is preferably the liquid/viscous flame retardant defined above. The flame retardants additionally usable in the floor covering based on cork are not subject to any special restriction and, for example, the flame retardants known in the related art from the group of carbonization-promoting and fire-smothering flame retardants, such as ammonium phosphate or dipentaerythritol, the flame retardants which form a barrier layer, such as borates and ammonium polyphosphates, the solid inorganic flame retardants, and the flame retardants which form an insulating layer and/or intumescence agents may be used. Furthermore, halogenated organic compounds, such as chlorinated paraffins, or halogenated organic phosphorus compounds may be used as an additional flame retardant. Solid inorganic flame retardants are understood to include, for example, inorganic compounds, such as aluminum oxide hydrates, borates, e.g., zinc borates, ammonium phosphate, antimony oxides, aluminum hydroxides, preferably aluminum trihydroxide, and magnesium hydroxide, aluminum hydroxide and magnesium hydroxide also being referred to as water-releasing flame retardants. The solid inorganic flame retardant aluminum trihydroxide is preferred. These flame retardants may be provided in the cork wear layer singly or as a mixture containing at least two of these flame retardants (from the same or different of the above-mentioned groups).

In a further preferred embodiment, the floor covering based on cork contains water glass in addition to the at least one liquid/viscous flame retardant, water glass preferably being contained in a quantity of up to approximately 15 weight-percent, in relation to the quantity of the wear layer.

To manufacture a cork floor covering of this type according to the present invention, typically cork granulate of a specific grain size distribution and residual moisture (preferably 1.5-3.0%) is mixed with melamine-formaldehyde resin as a binder and the flame retardants used according to the present invention described above and a typical cross-linking catalyst, the binder component typically being 10-30 weight-percent in this case, since a part of the binder is bound by the flame-retardant additives. This mixture is poured into thick-walled steel forms (exemplary dimensions: width 700 mm, length 1000 mm, height 800 mm) and compressed (preferably 10-200 tons). The cross-linking is performed at 110-135° C. within 8 to 22 hours, for example. The blocks manufactured in this way from cork granulate (having a residual height of 100-300 mm depending on the degree of compression/pressure, for example) are then cut/peeled into individual slabs using a band cutting facility. The slab thickness may be between 1 and 10 mm, for example. In order to achieve a smooth surface with a sharp contour, the slabs are typically ground and calibrated using a belt grinding machine. The top is preferably ground in this case using 3 to 6 grinding passes, initially with a coarse abrasive grit and finally with a fine abrasive grit (for example, 1st=40 grit, 2nd=80 grit, 3rd=120 grit, 4th=180 grit, 5th=220 grit, 6th=360 grit). The bottom is only ground with 1-2 grinding passes, for example with 24 and 40 grit. The slabs may subsequently be equipped with a surface protection. This may be performed, for example, using a PVC clear film (K value 60 or 80), a lacquer (PPG or Lott), or wax (for example, wax types: solid floor wax, Loba, Ditzingen Germany). Subsequently, tile-shaped slabs may be stamped out of the coated slabs and the edges may be cleaned up using cutters if necessary. The cork slabs manufactured in this way achieve a critical radiation strength of greater than 8 kW/m$^2$ and a fire progress of less than 150 mm within 20 seconds in accordance with EN ISO 9239-1, corresponding to a classification of $B_{FL}$ in accordance with prEN 13501-1: 1999.

The present invention and further advantages resulting therefrom will be described in greater detail in the following description with reference to the embodiments described in the examples.

EXAMPLES

Linoleum Floor Covering

First, all of the components for the linoleum compounds listed in the following Table 1 are mixed in a suitable mixing unit into a basic mass (mixed mass) which is as homogeneous as possible. The mixed mass obtained is processed into rough sheets by a rolling mill and supplied to a grater and/or granulator, after which the mixed mass particles thus obtained are supplied to a calender and pressed onto jute as a carrier material under pressure and a temperature typically from 10° C. to 150° C.

A formulation according to the present invention is listed as an example in Table 1, the values specified relating to weight-percent in relation to the quantity of the total mixture (wear layer). The individual components of the formulation specified in Table 1 are to be selected in such a way that the value 100 weight-percent results for the wear layer for each specific formulation.

TABLE 1

| Formula | (Weight-percent) |
| --- | --- |
| Cement | 30-55 |
| Cork flour | 0-25 |
| Wood flour | 5-45 |
| Chalk | 0-60 |
| Titanium dioxide | 1-15 |
| Colored pigments | 0-5 |
| Diatomaceous earth | 0-8 |
| Zinc oxide | 0-5 |
| Aluminum trihydroxide | 0-60 |
| Liquid/viscous flame retardant | 0.01-20 |

The formulation listed in Table 1 and/or the linoleum floor covering manufactured therefrom shows, because of the liquid/viscous flame retardants used according to the present invention and possibly further flame retardants, drastically improved flame protection properties in comparison to a typical linoleum floor covering without flame retardants, with properties which otherwise remain the same.

The invention claimed is:

1. A floor covering based on linoleum, comprising at least one wear layer made of linoleum, wherein the wear layer contains at least one phosphorus-containing compound, solution, suspension, or dispersion as a liquid/viscous flame retardant in a quantity of more than 0 and up to 20 weight-percent, in relation to the quantity of the wear layer, wherein the wear layer further contains water glass, and wherein the linoleum comprises linoleum cement, cork- and/or wood-flour and pigment, wherein the linoleum cement comprises vegetable oil and/or fat and rosin.

2. The floor covering according to claim 1, wherein the liquid/viscous flame retardant is selected from the group consisting of phosphates, phosphites, phosphonates, organically substituted phosphonates, an aqueous/oleaginous dispersion containing red phosphorus, and mixtures thereof.

3. The floor covering according to claim 1, wherein the wear layer made of linoleum further comprises a flame retardant selected from the group consisting of carbonization-promoting and fire-smothering flame retardants, flame retardants which form a barrier layer, intumescence agents, solid inorganic flame retardants, and mixtures thereof.

4. The floor covering according to claim 3, wherein the solid inorganic flame retardant is aluminum trihydroxide.

5. The floor covering according to claim 1, wherein the wear layer contains water glass in a quantity of more than 0 and up to 15 weight-percent, in relation to the quantity of the wear layer.

6. A method for manufacturing a floor covering based on linoleum, comprising at least one wear layer made of linoleum, wherein the wear layer contains at least one phosphorus-containing compound, solution, suspension, or dispersion as a liquid/viscous flame retardant in a quantity of more than 0 and up to 20 weight-percent, in relation to the quantity of the wear layer, wherein the wear layer further contains water glass, in which a linoleum mixed mass containing the at least one liquid/viscous flame retardant and further containing the water glass is processed by calendaring or rolling into a floor covering using calenders or rolling mills, and wherein the linoleum comprises linoleum cement, cork- and/or wood-flour and pigment, wherein the linoleum cement comprises vegetable oil and/or fat and rosin.

\* \* \* \* \*

UNITED STATES PATENT AND TRADEMARK OFFICE
CERTIFICATE OF CORRECTION

PATENT NO. : 7,544,421 B2
APPLICATION NO. : 10/499350
DATED : June 9, 2009
INVENTOR(S) : Guido Burmeister, Hanns-Jorg Mauk and Milko Ess Page 1 of 1

It is certified that error appears in the above-identified patent and that said Letters Patent is hereby corrected as shown below:

Title Page, Item (73) Assignee: please correct the assignee's address from "Bietigheim-Gissingen" to "Bietigheim-Bissingen".

Signed and Sealed this
First Day of February, 2011

David J. Kappos
*Director of the United States Patent and Trademark Office*